United States Patent
Wallin et al.

(10) Patent No.: US 10,330,222 B2
(45) Date of Patent: Jun. 25, 2019

(54) FOLDABLE DUCT COMPRISING LAMINATED FOIL ON INSIDE AND OUTSIDE

(71) Applicant: CLIMATE RECOVERY IND AB, Kalmar (SE)

(72) Inventors: Peter Wallin, Kalmar (SE); Göran Bernhardsson, Stockholm (SE)

(73) Assignee: CLIMATE RECOVERY IND AB, Kalmar (SE)

( * ) Notice: Subject to any disclaimer, the term of this patent is extended or adjusted under 35 U.S.C. 154(b) by 0 days.

(21) Appl. No.: 15/555,523

(22) PCT Filed: Mar. 4, 2016

(86) PCT No.: PCT/SE2016/050172
§ 371 (c)(1),
(2) Date: Sep. 4, 2017

(87) PCT Pub. No.: WO2016/144237
PCT Pub. Date: Sep. 15, 2016

(65) Prior Publication Data
US 2018/0051832 A1  Feb. 22, 2018

(30) Foreign Application Priority Data
Mar. 6, 2015  (SE) ...................... 1550278

(51) Int. Cl.
*F16L 11/02*  (2006.01)
*B32B 15/20*  (2006.01)
(Continued)

(52) U.S. Cl.
CPC .............. *F16L 11/02* (2013.01); *B32B 15/20* (2013.01); *B32B 27/12* (2013.01); *B32B 27/36* (2013.01);
(Continued)

(58) Field of Classification Search
CPC ......... F16L 57/04; F16L 11/02; F16L 59/141; Y10T 428/1393
(Continued)

(56) References Cited

U.S. PATENT DOCUMENTS 3,212,529 A     10/1965  Ullman et al.
3,980,107 A  *   9/1976  Barnes ..................... B65D 3/22
                                                                138/143
(Continued)

FOREIGN PATENT DOCUMENTS

EP    2292426 A1   3/2001
JP    2013113454 A  6/2013
JP    2015004503 A  1/2015

OTHER PUBLICATIONS

European Search Report (dated Jun. 15, 2018) for corresponding European App. 16762057.
(Continued)

*Primary Examiner* — Patrick F Brinson
(74) *Attorney, Agent, or Firm* — WRB-IP LLP

(57) ABSTRACT

The present invention concerns a foldable duct (4) made of glass or stone fibers and binder agent having a foil (1) laminated thereon, on the inside and outside of the duct, wherein the foil (1) at least comprises:
  an outer layer of aluminum (5),
  an intermediate layer of a thermoplastic polymer (6) having a lower melt point than polyethylene, positioned closest to the outer layer of aluminum (5),
  an intermediate layer of polyethylene (7), positioned between the intermediate layer of thermoplastic polymer (6), and
  an inner layer of a thermoplastic polymer (8) having a lower melt point than polyethylene.

9 Claims, 1 Drawing Sheet

(51) Int. Cl.
  *B32B 27/36* (2006.01)
  *B32B 27/12* (2006.01)
  *F24F 13/02* (2006.01)
  *F16L 57/04* (2006.01)
  *B32B 15/08* (2006.01)
  *B32B 5/02* (2006.01)
  *B32B 7/12* (2006.01)
  *B32B 27/08* (2006.01)
  *B32B 27/32* (2006.01)

(52) U.S. Cl.
  CPC .......... *F16L 57/04* (2013.01); *F24F 13/0272* (2013.01); *B32B 5/028* (2013.01); *B32B 7/12* (2013.01); *B32B 15/08* (2013.01); *B32B 27/08* (2013.01); *B32B 27/32* (2013.01); *B32B 2262/10* (2013.01); *B32B 2262/101* (2013.01); *B32B 2307/3065* (2013.01); *B32B 2307/31* (2013.01); *B32B 2307/50* (2013.01); *B32B 2307/546* (2013.01); *B32B 2307/718* (2013.01); *B32B 2307/732* (2013.01); *B32B 2597/00* (2013.01)

(58) Field of Classification Search
  USPC ............... 138/149, 147; 428/36.9, 156, 194; 156/60
  See application file for complete search history.

(56) References Cited

U.S. PATENT DOCUMENTS

| | | | |
|---|---|---|---|
| 7,624,762 B2* | 12/2009 | Cohen | B32B 15/08 138/149 |
| 8,141,594 B2* | 3/2012 | Shumate | B29C 63/06 138/149 |
| 2004/0052987 A1* | 3/2004 | Shetty | B31C 3/04 428/34.2 |
| 2007/0178283 A1 | 8/2007 | Tigerfeldt | |
| 2010/0319839 A1 | 12/2010 | Shumate | |
| 2011/0155275 A1 | 6/2011 | Wallin et al. | |
| 2014/0227488 A1 | 8/2014 | Wallin et al. | |
| 2014/0290785 A1 | 10/2014 | Wallin et al. | |

OTHER PUBLICATIONS

International Search Report (dated Jun. 23, 2016) for corresponding International App. PCT/SE2016/050172.

* cited by examiner

FOLDABLE DUCT COMPRISING LAMINATED FOIL ON INSIDE AND OUTSIDE

TECHNICAL FIELD

The present invention concerns foldable duct having a foil laminated thereon. The foil is especially suitable for laminating ducts, preferably made up of mineral fibres, such as glass or stone fibres, and binder agent. The ducts may be suitable for use in ventilation systems.

BACKGROUND ART

Previous foils used for laminating ducts are made up by a metal layer, usually aluminium, and a polymer layer, usually polyethylene (PE). These kind of layers have low mechanical properties, i.e. break easily when bent or stretched or exposed to pressures, especially concentrated pressures.

SUMMARY OF THE INVENTION

An aim of the present invention is to provide a duct having a foil that has better mechanical properties than previously known foils. Another aim is to provide a fire protecting foil. Especially, an aim is to provide a foldable foil which does not rupture due to folding and stretching. Thus an aim is to provide a foil with some flexibility.

A solution according to the present invention is to add a layer of a polyethylene, such as polyethylene terephthalate (PET), to the previously known foils of an outer aluminium layer and an inner layer of polyethylene (PE). Although, this inner layer may be any thermoplastic polymer having a melting point below the polyethylene. This layer of polyethylene such as PET brings a flexibility to the foil at the same time as it does not break easily when it is exposed to mechanical forces, such as bending, stretching and pressure. Thus the foil will withstand folding and concentrated pressures. Withstanding folding is important during transport of ducts and building of duct systems. Withstanding pressure is important not to puncture the foil. The foil needs to be intact in order to provide fire protection.

It is a special aim to provide a foil that can be folded and unfolded repeatedly without breaking. The development of a duct with clearly defined folding lines combined with zones that will not be folded put these special requirements on the foil. When folded the duct will be folded again and again in the same place. The high requirements on fire resistance, unburnability, steam resistance and air tightness all after repeated folding have pushed forward this product.

Preferably an additional layer of a thermoplastic polymer having a melting point below polyethylene such as PET is intermediate the outer aluminium layer and the layer of PET in order to adhere the aluminium layer to the PET layer. The adhesion arises when the polymer is melted. Thus the intermediate layer of a thermoplastic polymer having a melting point below PET functions as an adhesive. The inner layer of thermoplastic polymer having a melting point below PET also functions as an adhesive between the PET layer and the duct or the outer layer of aluminium, when wrapped around or inside a duct. The foil is heat sealable. The duct is preferably made up of mineral fibres, such as glass fibres, and binder agent and preferably used in ventilation systems.

According to another embodiment the foil further comprises an intermediate layer of glass fibres, which further enhances the mechanical properties, especially the withstanding of pressure. Preferably the intermediate layer of glass fibres is present in between the intermediate layer of polyethylene such as PET and the inner layer of thermoplastic polymer having a melting point below polyethylene such as PET. Preferably the thermoplastic polymer having a melting point below polyethylene such as PET is polyethylene (PE).

An aim is to fulfil a specific fire protection classification called A2s1d0. This means that the energy content of the product may not exceed 3 MJ/kg (A2); the smoke exhaust must be low (s1); and no dripping of melted product is allowed during fire (d0). This means that the foil must fulfil these requirements. In such an embodiment the inner layer of PE has a weight of 20-30 g/m², preferably 22-28 g/m² and/or the intermediate layer of PE has a weight of 10-20 g/m², preferably 12-18 g/m². The foil may have a total weight of 75-105 g/m², preferably 85-95 g/m² and a total thickness of 40-60 μm, preferably 45-55 μm.

According to a further aspect of the present invention the foil is used on the inside and/or on the outside of a duct, which is foldable. Preferably the foil is present at least on the inside. The foil is laminated by heat sealing. The duct is preferably made up by glass or stone fibres and binder agent.

The foil may have additional layers although it should at least have the layers according to the claims. For example it is possible to add a coating of lacquer on top of the aluminium layer.

SHORT DESCRIPTION OF THE DRAWINGS

The present invention will now be described in detail under reference to the accompanying drawings, in which FIG. 1 shows a schematic cross sectional view of layers of a first embodiment of the present inventive foil.

DETAILED DESCRIPTION OF EMBODIMENTS OF THE INVENTION

Figure 1:
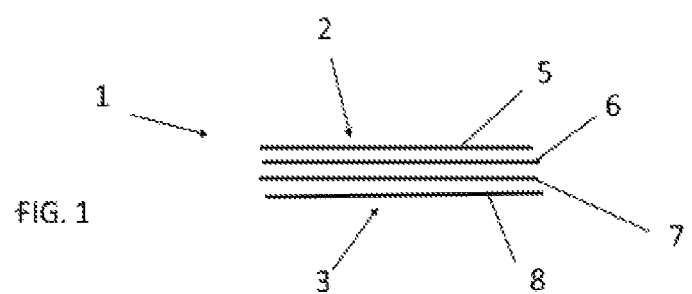

In FIG. 1 a first embodiment of a foil 1 according to the present invention is shown. The layers forming the foil will be described from the outside 2, from the top in the figure, to the inside 3 facing a duct 4, for example.

An outer layer 5 is made of aluminium. Underneath an intermediate layer 6 of a thermoplastic polymer having a melting point below polyethylene for example polyethylene terephthalate (PET), such as polyethylene (PE), is provided, which unite the outer layer 5 with an intermediate layer 7 of polyethylene such as polyethylene terephthalate (PET). This is made by means of heating the foil 1 up to the melting point of polyethylene PE, which normally is between 80-100° C. The melting point of aluminium and polyethylene such as PET is higher than PE.

Figure 3:
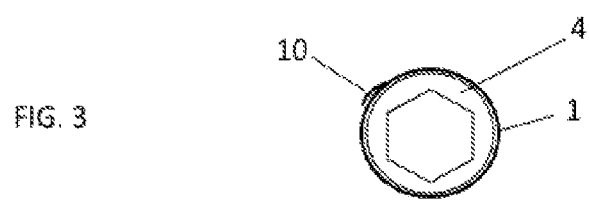
FIG. 3 shows a cross sectional view of a duct with a foil having an overlapping edge.

Underneath the intermediate layer 7 of polyethylene such as PET is an inner layer 8 provided made of a thermoplastic polymer having a melting point below polyethylene for example PET, such as PE. The inner layer 8 of PE is also meltable in order to adhere to for example a duct, preferably a duct made of glass fibres and binder agent, or the outer layer 5 of aluminium when an overlapping edge 10 is to be fastened when applied to a duct. See FIG. 3.

Figure 2:
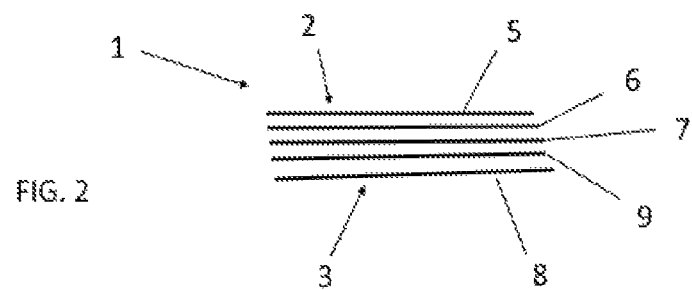
FIG. 2 shows a schematic cross sectional view of layers of a second embodiment of the present inventive foil.

According to a second embodiment of the foil according to the present invention a layer 9 of glass fibres is provided between the intermediate layer 6 of a thermoplastic polymer having a melting point below polyethylene for example PET, such as PE, and the intermediate layer 7 of polyethylene such as PET, or between the intermediate layer 7 of polyethylene such as PET and the inner layer 8 of a thermoplastic polymer having a melting point below PET, such as PE, which is shown in FIG. 2.

Preferably the layer 9 of glass fibres is arranged like a net. According to a suggested embodiment the net is a 5×10 glass fibre scrim. The layer 9 of glass fibres are adhered to the layer 7 of polyethylene such as PET by means of the inner layer 8 of for example PE when it is melted.

It is also possible to add an outer layer of lacquer to the aluminium layer to avoid oxidation on the aluminium surface.

The foil may have a total weight of 75-105 $g/m^2$, preferably 85-95 $g/m^2$ and a total thickness of 40-60 μm, preferably 45-55 μm.

The invention claimed is:

1. A foldable duct made of glass or stone fibres and, binder agent having a foil laminated thereon, on the inside and outside of the duct, wherein the foil at least comprises:
   an outer layer of aluminium,
   an intermediate layer of a thermoplastic polymer having a lower melt point than polyethylene terephthalate (PET), positioned closest to the outer layer of aluminium,
   an intermediate layer of polyethylene terephthalate (PET), positioned between the intermediate layer of thermoplastic polymer, and
   an inner layer of a thermoplastic polymer having a lower melt point than polyethylene terephthalate (PET).

2. The foldable duct according to claim 1, wherein, the foil further comprises an intermediate layer of glass fibres.

3. The foldable duct according to claim 2, wherein the intermediate layer of glass fibres is present in between the intermediate layer of polyethylene and the inner layer of a thermoplastic polymer having a lower melt point than polyethylene.

4. The foldable duct according to claim 2, wherein the intermediate layer of glass fibres is in the form of a net.

5. The foldable duct according to claim 1, wherein the thermoplastic polymer having a lower melt point that polyethylene terephthalate (PET) is polyethylene (PE).

6. The foldable duct according to claim 1, wherein the inner layer of PE has a weight of 20-30 g/m2.

7. The foldable duct according to claim 1, wherein the intermediate layer of PE has a weight of 10-20 g/m2.

8. The foldable duct according to claim 1, wherein the total weight is 75-105 g/m2.

9. The foldable duct according to claim 1 wherein the total thickness is 40-60 μm.

* * * * *